United States Patent  
Iwayama et al.

(10) Patent No.: US 8,803,818 B2
(45) Date of Patent: Aug. 12, 2014

(54) INPUT APPARATUS, INPUT DETERMINING METHOD, AND STORAGE MEDIUM STORING INPUT PROGRAM

(75) Inventors: Naomi Iwayama, Kawasaki (JP); Kenji Nakajima, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 584 days.

(21) Appl. No.: 12/793,921

(22) Filed: Jun. 4, 2010

(65) Prior Publication Data

US 2010/0309158 A1    Dec. 9, 2010

(30) Foreign Application Priority Data

Jun. 9, 2009   (JP) .................. 2009-138532

(51) Int. Cl.
*G06F 3/041* (2006.01)
*G06F 15/16* (2006.01)
*G06F 3/0488* (2013.01)
*G06F 1/16* (2006.01)

(52) U.S. Cl.
CPC ............ *G06F 3/0488* (2013.01); *G06F 1/1647* (2013.01); *G06F 1/1643* (2013.01)
USPC .......................................... 345/173; 345/502

(58) Field of Classification Search
USPC ........................................................ 345/173
See application file for complete search history.

(56) References Cited

U.S. PATENT DOCUMENTS 6,252,563 B1    6/2001   Tada et al.
2005/0093868 A1*  5/2005   Hinckley ...................... 345/502

FOREIGN PATENT DOCUMENTS

| JP | 06-044001   | 2/1994  |
| JP | 11-073269   | 3/1999  |
| JP | 2000-242393 | 9/2000  |
| JP | 2004-280319 | 10/2004 |
| JP | 2004-288048 | 10/2004 |

* cited by examiner

*Primary Examiner* — Charles V Hicks
(74) *Attorney, Agent, or Firm* — Staas & Halsey LLP

(57) ABSTRACT

An input apparatus includes, a display unit that causes a plurality of display screens on which images are to be displayed to display the images, a input detecting unit that detects a first input on a first display screen, a second input on the first display screen, and a third input on a second display screen, a position acquiring unit that acquires a first position, a second position and a third position, a start-position estimating unit that estimates a start position of an associated operation on the second display screen, and a continuity determining unit that determines whether the third input is the associated operation based upon the third position and the start position.

13 Claims, 13 Drawing Sheets

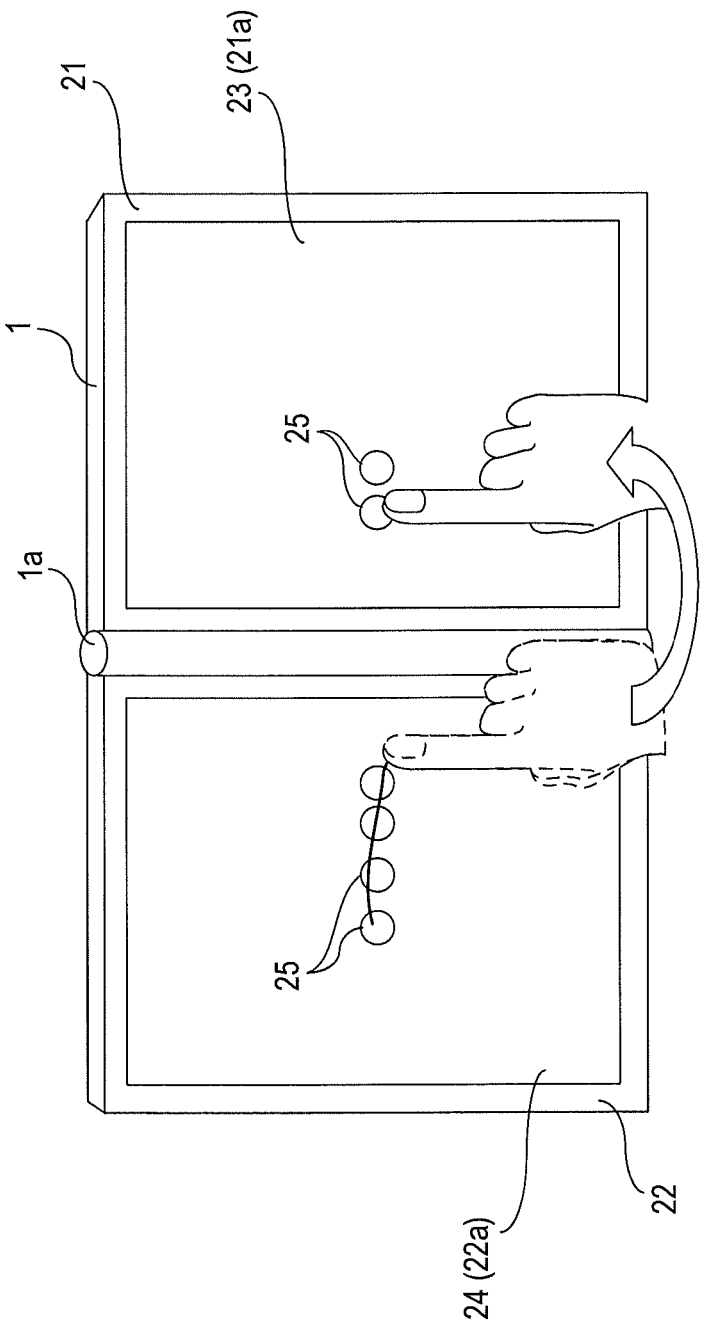

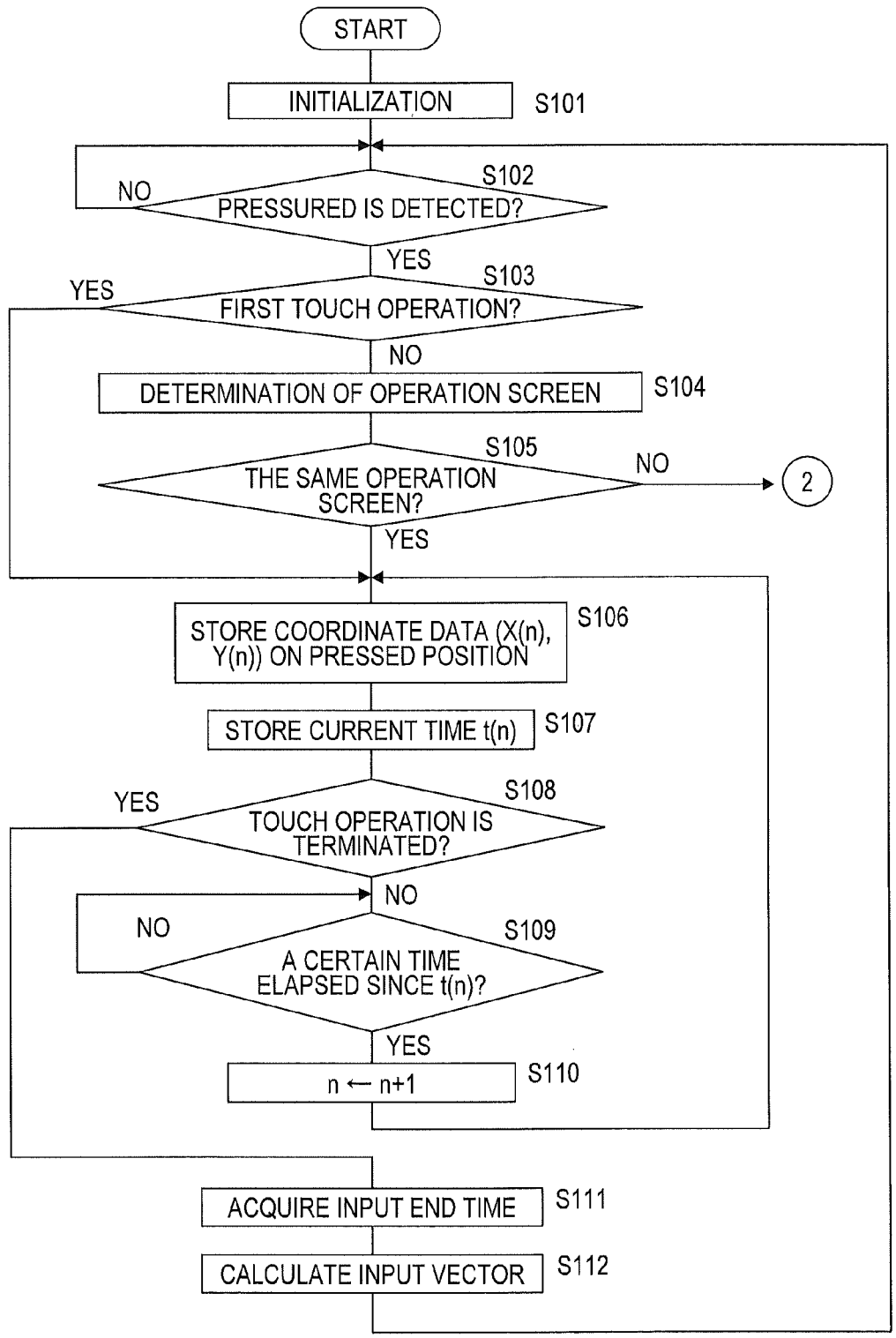

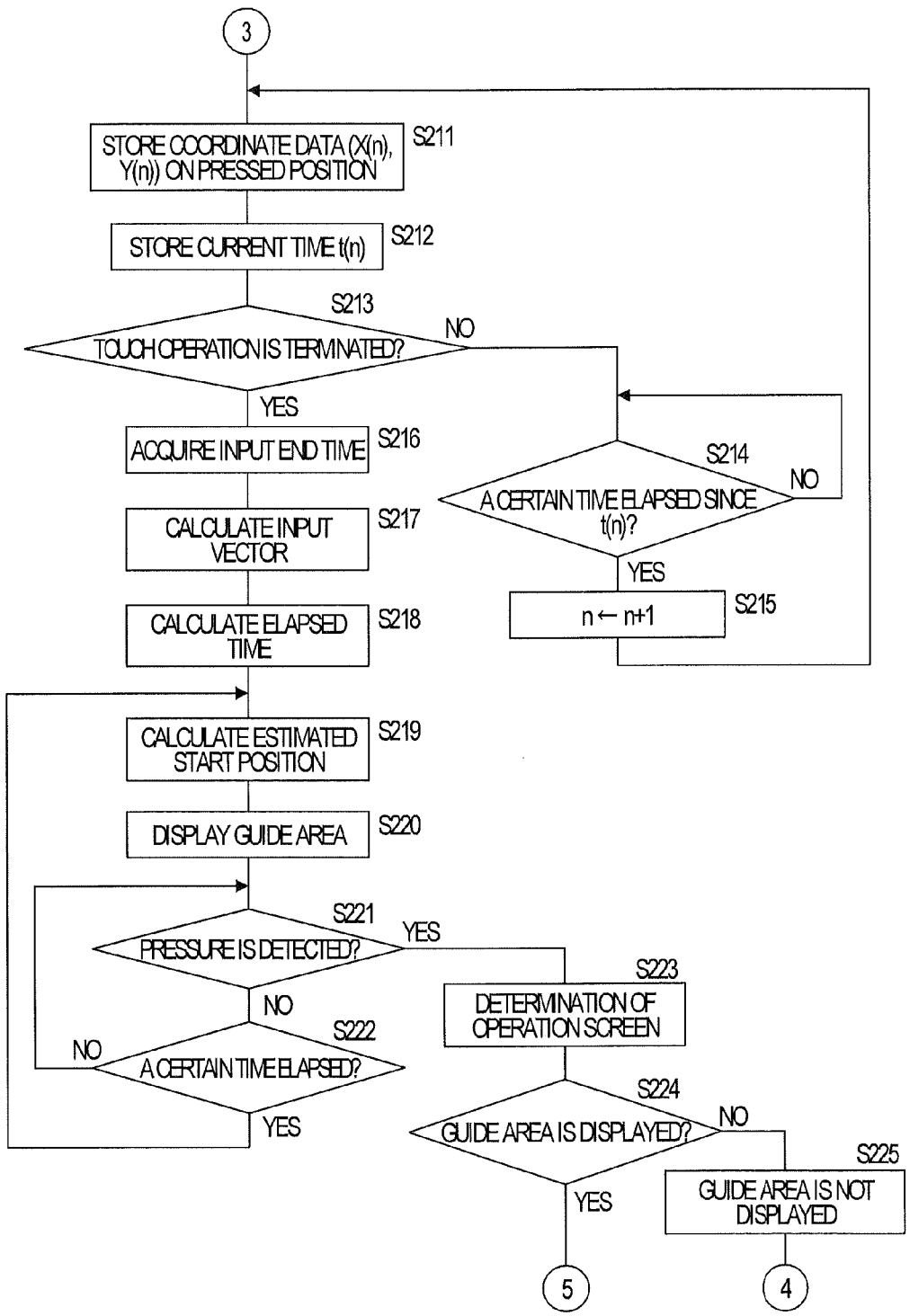

INPUT APPARATUS, INPUT DETERMINING METHOD, AND STORAGE MEDIUM STORING INPUT PROGRAM

CROSS-REFERENCE TO RELATED APPLICATIONS

This application is based upon and claims the benefit of priority of the prior Japanese Patent Application No. 2009-138532, filed on Jun. 9, 2009, the entire contents of which are incorporated herein by reference.

FIELD

The embodiment discussed herein is related to an input apparatus, an input determining method, and a storage medium storing an input program. The input apparatus, the input determining method, and the input program each determine the continuity of inputs, for example, by a user with multiple touch panels.

BACKGROUND

Electronic devices provided with touch panels with which the screens of display apparatuses are covered have been developed in recent years. The electronic devices include personal digital assistants (PDAs), portable game machines, and mobile phones. A user of such an electronic device provided with a touch panel presses a portion of the touch panel, which is over an image displayed on the screen, with his/her finger or a pen. The user is capable of operating the image corresponding to the pressed portion. When a pointer (cursor) is displayed on the screen, the user first presses a portion where the pointer is displayed with his/her finger or the like. Then, the user slides his/her finger on the touch panel. The user is capable of moving the pointer. The provision of the touch panel allows the user to instinctively operate the electronic device. In addition, there is no need to provide, for example, selection buttons used to select an image and operation buttons used to move the pointer in the electronic device provided with the touch panel. Accordingly, it is possible to save the spaces where the buttons are provided and to increase the screen in size in the electronic device provided with the touch panel.

Electronic devices including two screens that are covered with touch panels have also been developed. In such an electronic device, for example, two display apparatuses are connected with a hinge mechanism. The electronic device may be collapsed in a state where the two screens are opposed to each other. This configuration may prevent the electronic device from increasing in size. When the electronic device is used by a user, the electronic device changes from the state in which the electronic device is collapsed to a state in which the two screens are arranged in parallel with the hinge mechanism provided therebetween. The provision of the two screens allows the electronic device to display a larger amount of information, compared with the case in which one screen is provided.

It is necessary for the electronic device including the two screens covered with the touch panels to determine whether operations performed with the touch panels are associated with each other. An operation performed with each touch panel, for example, by touch of user (e.g., finger) and/or a device/utensil (e.g., stylus, pen, etc.), is hereinafter referred to as a touch operation. For example, when the user attempts to move a pointer displayed on one screen to the other screen, the user is required to release his/her finger on the pointer from the touch panel with which the one screen is covered because the hinge mechanism is provided between the two touch panels. In this case, it is necessary for the electronic device to correctly determine whether the movement operation of the pointer by the user is terminated or whether the movement operation continues into the touch operation on the other touch panel.

A typical electronic device provided with two screens in related art determines that the touch operation on one touch panel continues into the touch operation on the other touch panel if the time period between the time when the touch operation on the one touch panel is terminated and the time when the touch operation on the other touch panel is started is within a certain time. Japanese Unexamined Patent Application Publication No. 11-73269 discloses a method of determining that the touch operation on one touch panel continues into the touch operation on the other touch panel if the touch operation on the one touch panel is terminated within a certain area. The technology disclosed in Japanese Unexamined Patent Application Publication No. 11-73269 determines the start position of the touch operation on the other touch panel, which corresponds to the end position of the touch operation on the one touch panel, and displays the determined position on the screen covered with the other touch panel to notify the user of the position to be pressed. In addition, Japanese Unexamined Patent Application Publication No. 2000-242393 discloses a method of determining that the touch operation on one touch panel continues into the touch operation on the other touch panel if a position set on the other touch panel is pressed when the touch operation on the other touch panel is started after the touch panel on the one touch panel is terminated.

SUMMARY

According to an aspect of the invention, an input apparatus includes, a display unit that causes a plurality of display screens on which images are to be displayed to display the images, a input detecting unit that detects a first input, for example, by a user on a first display screen, among the plurality of display screens, a second input, for example, by the user on the first display screen, and a third input, for example, by the user on a second display screen different from the first display screen, a position acquiring unit that acquires a first position where the first input is detected, a second position where the second input is detected, and a third position where the third input is detected, a start-position estimating unit that estimates a start position of an associated operation on the second display screen associated with an operation including the first input and the second input on the basis of the first position and the second position acquired by the position acquiring unit and a first time when the first position is acquired, and a continuity determining unit that determines whether the third input is the associated operation on the basis of the third position and the start position estimated by the start-position estimating unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 1A and 1B are schematic diagrams illustrating an example of an electronic device provided with an input apparatus according to a first embodiment of the present invention;

FIGS. 6A and 6B are flowcharts illustrating an example of a process performed by the input apparatus according to the first embodiment of the present invention;

FIGS. 10A and 10B are flowcharts illustrating an example of a process performed by the input apparatus according to the third embodiment of the present invention.

DESCRIPTION OF EMBODIMENTS

The speed at which a touch operation on one touch panel is moved to a touch operation on the other touch panel depends on the user. When an electronic device is used in a stable state, the user may finish the touch operation at a certain position. However, when the electronic device is used in an unstable state, such as during walking, it may be difficult for the user to finish the touch operation at a certain position. With the above technologies in the related art, it is not possible to correctly determine the continuity of the touch operations in the case where it is difficult for the user to finish the touch operation at a certain position. In addition, the touch operations may not be processed in the manner intended by the user with the above technologies in the related art.

In order to resolve the above problems, the inventor et al. have invented an input apparatus, an input determining method, and a storage medium storing an input program. The input apparatus, the input determining method, and the input program are capable of processing operations performed on different display screens as continuous operations intended by the user.

Preferred embodiments of the input apparatus, the input determining method, and the storage medium storing the input program, disclosed in the present invention, will herein be described in detail with reference to the attached drawings. The input apparatus and the input determining method disclosed in the present invention are used in an electronic device, such as a mobile phone, a portable game machine, a mobile music player, or a PDA, including at least two (two or more) display screens.

First Embodiment

Figure 1A:
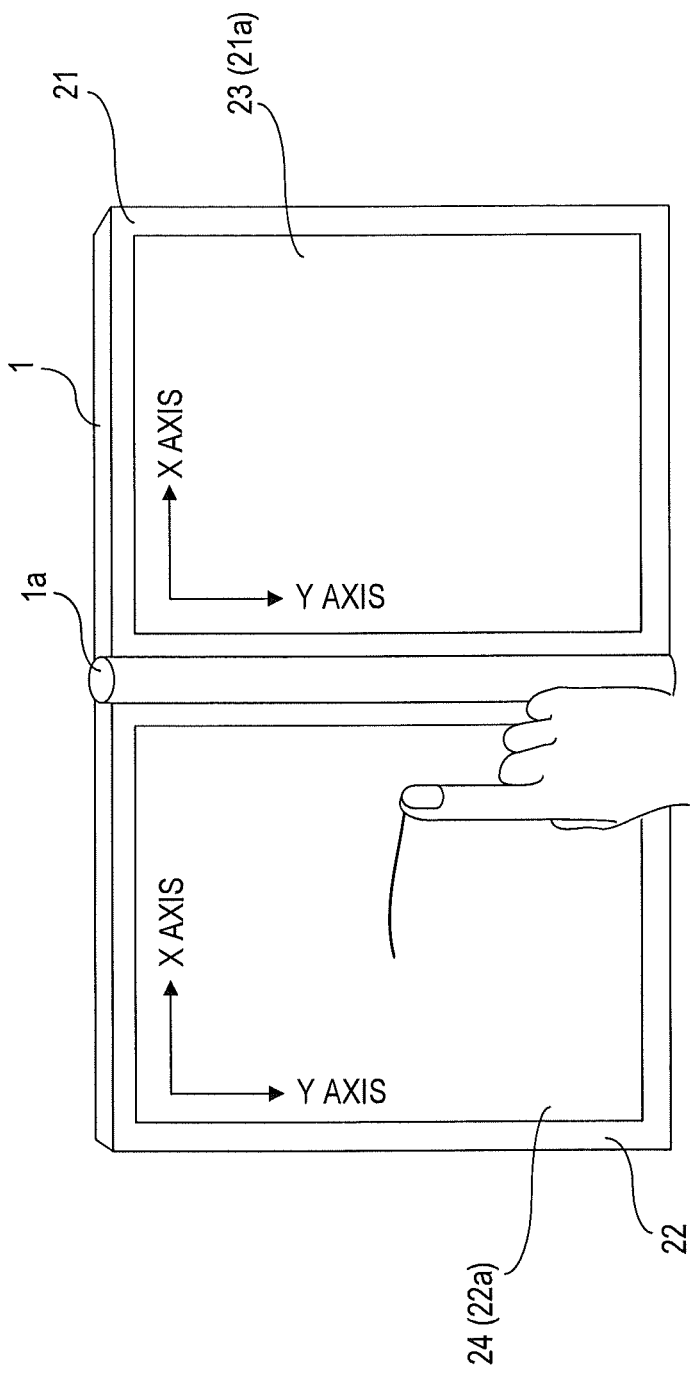

FIGS. 1A and 1B are schematic diagrams illustrating an example of an electronic device provided with an input apparatus according to a first embodiment of the present invention.

An electronic device 1 provided with the input apparatus according to the first embodiment includes two liquid crystal displays (LCDs) 21 and 22. Hereinafter, the electronic device 1 provided with the input apparatus is referred to as the electronic device 1. The two LCDs 21 and 22, which are display units, are connected to each other via a hinge mechanism 1a and are capable of pivoting about the hinge mechanism 1a. The user may pivotally move the LCDs 21 and 22 to open and close the electronic device 1 in accordance with the state in which the electronic device 1 is used. The user uses the electronic device 1 in an open state in which the electronic device 1 is opened. In contrast, the user closes the electronic device 1 when the user does not use the electronic device 1. The state in which the electronic device 1 is opened means a state in which a display screen 21a of the LCD 21 is symmetric to a display screen 22a of the LCD 22 with the hinge mechanism 1a sandwiched therebetween, as illustrated in FIGS. 1A and 1B. The state in which the electronic device 1 is closed means a state in which the display screen 21a is opposed to the display screen 22a although now illustrated. The electronic device 1 may be made compact when the electronic device 1 is not used and the display screens 21a and 22a may be used when the electronic device 1 is used. The side at which the LCD 21 is positioned is referred to as the right side and the side at which the LCD 22 is positioned is referred to as the left side in the state in which the electronic device 1 is opened in the following description.

One or more images are displayed on the display screen 21a of the LCD 21 and the display screen 22a of the LCD 22. Different images may be displayed on the display screens 21a and 22a or the similar image may be displayed on the display screens 21a and 22a. In the first embodiment, the electronic device 1 horizontally displays one sentence across the two display screens 21a and 22a. In this case, part of the sentence is displayed on the left display screen 22a and the remaining part of the sentence is displayed on the right display screen 21a.

Touch panels 23 and 24 are provided so that the display screens 21a and 22a of the LCDs 21 and 22 are covered with the touch panels 23 and 24, respectively, in the electronic device 1. The touch panels 23 and 24 each detect a position input by the user. Hereinafter a position input is referred to as a pressed position. The touch panels 23 and 24 are optical transmission panels. A coordinate plane using the upper left corner as the origin is virtually set in each of the touch panels 23 and 24, as illustrated in FIG. 1A. On the coordinate plane, the direction in which the touch panels 23 and 24 are arranged is set as the X axis and the direction of the shaft of the hinge mechanism 1a is set as the Y axis. When the touch panels 23 and 24 are pressed by the user, the touch panels 23 and 24 detect the XY coordinate of the pressed position on the basis of the coordinate plane that is set. In order to detect the pressed position, for example, a resistance film method, an optical (infrared) method, an electrostatic capacity coupling method, a surface acoustic wave method, an acoustic pulse recognition method, an oscillator detection method, an electromagnetic induction method, an electrostatic sensor method, an optical sensor method, or an image recognition method in the related art is used. If the pressed position is matched with the position where an image, such as an icon or a pointer, is displayed on the display screen 21a or 22a, the electronic device 1 determines that the image displayed at the pressed position is selected. The electronic device 1 performs an appropriate process on the basis of the selected image.

The electronic device 1 according to the first embodiment displays multiple images 25, as illustrated in FIG. 1B. If the user slides his/her finger or the like through the multiple images 25 while pressing the touch panel 23 or 24 with his/her finger or the like, the electronic device 1 determines that the multiple images 25 are selected. Accordingly, the user may select the multiple images 25 with one operation. When the multiple images 25 are selected, the image 25 which the user wants to select may be displayed across the two display screens 21a and 22a. Although the multiple images 25 are represented by similar circles in FIGS. 1A and 1B, the multiple images 25 may have different shapes. In the above case, the user performs the touch operation across the two touch panels 23 and 24, as illustrated in FIG. 1B. The touch operation to select multiple images by sliding a finger of the user or the like is hereinafter referred to as a slide operation.

Figure 2:
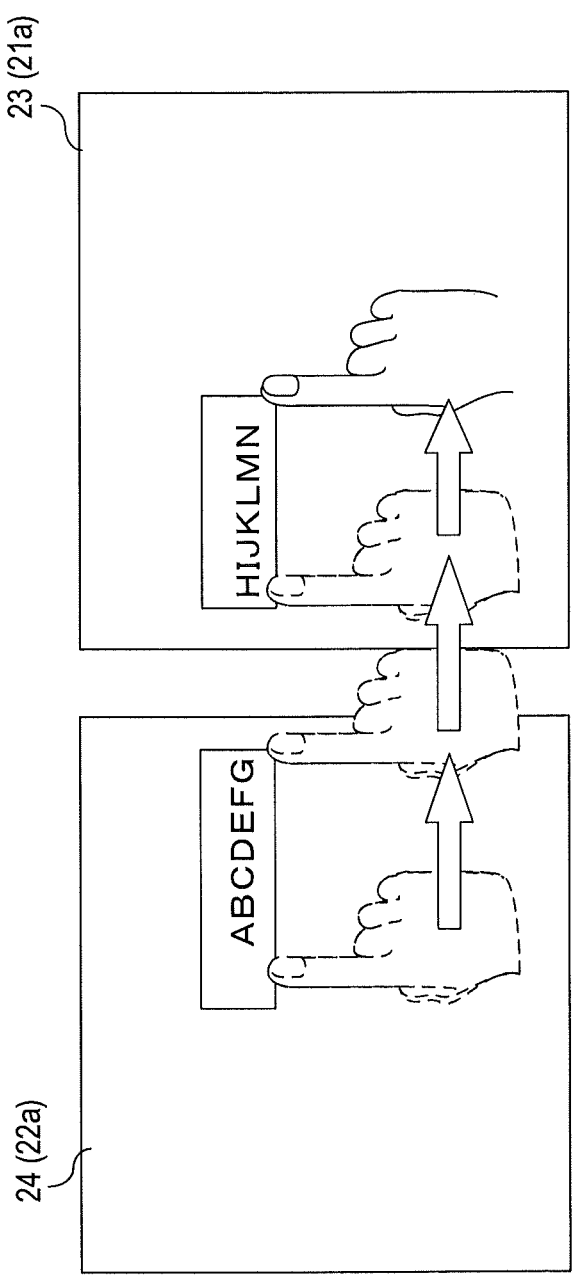
FIG. 2 is a schematic diagram illustrating an example of a touch operation across two touch panels.

FIG. 2 is a schematic diagram illustrating an example of a touch operation across the two touch panels 23 and 24. In the example in FIG. 2, a series of letters "ABCDEFGHIJKLMN" is displayed across the two display screens 21a and 22a. The letters "CDEFGHIJKL" are selected in the example in FIG. 2. The selected letters may be, for example, copied.

The letters "ABCDEFG" are displayed on the left display screen 22a and the letters "HIJKLMN" are displayed on the right display screen 21a. The user performs the slide operation from the letter "C" to the letter "G" on the left touch panel 24. After releasing his/her finger from the touch panel 24, the user performs the slide operation from the letter "H" to the letter "L" on the right touch panel 23. The electronic device 1 determines whether the slide operation on the touch panel 24 continues into the slide operation on the touch panel 23. The continuous operations mean that the touch operation on the touch panel 24 is associated with the touch operation on the touch panel 23. For example, if the electronic device 1 determines that the slide operation on the touch panel 24 continues into the slide operation on the touch panel 23 in the example in FIG. 2, a series of letters "CDEFGHIJKL" is selected. In contrast, if the electronic device 1 determines that the slide operation on the touch panel 24 does not continue into the slide operation on the touch panel 23 in the example in FIG. 2, a series of letters "HIJKL" is selected. An example of the configuration of the electronic device 1 provided with the input apparatus disclosed in the present invention, which is configured to realize correct determination of the continuity of touch operations, and an example of a process performed by the input apparatus in the electronic device 1 will now be described in detail.

Figure 3:
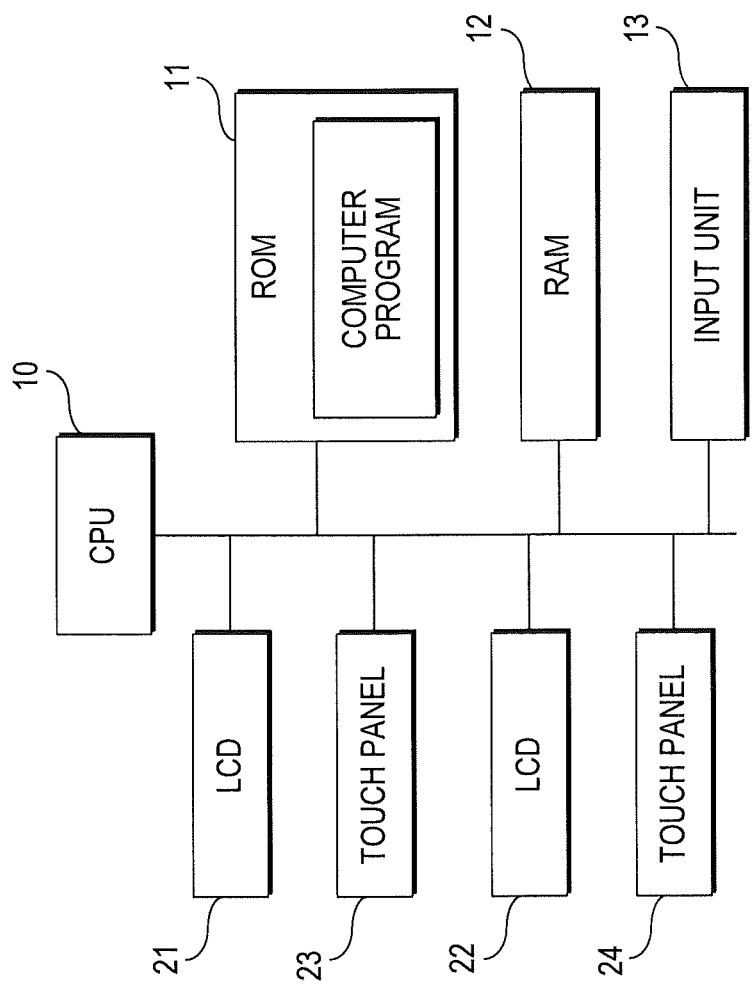
FIG. 3 is a block diagram schematically illustrating an example of the electrical configuration of the electronic device provided with the input apparatus according to the first embodiment of the present invention.
Figure 4:
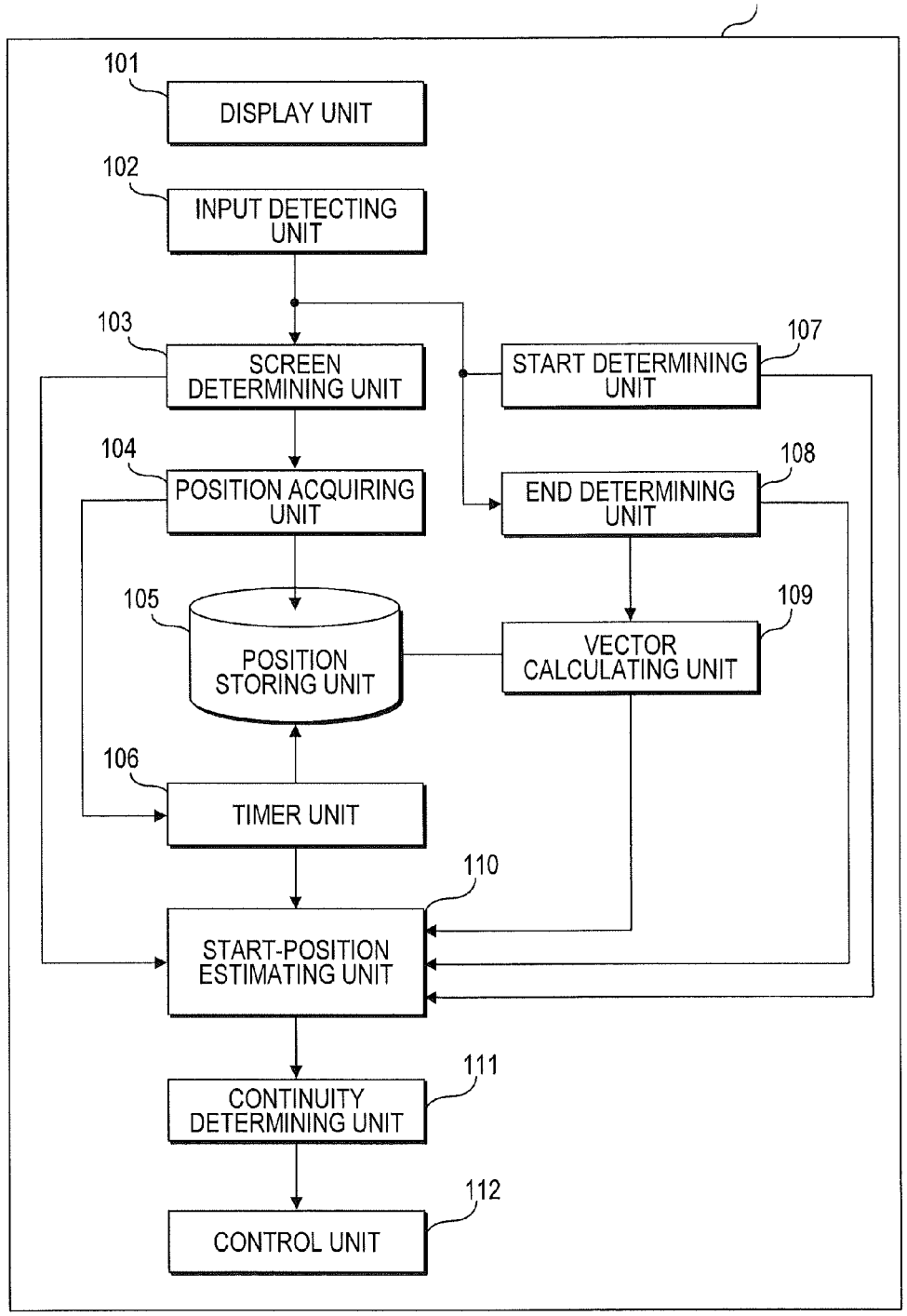
FIG. 4 is a block diagram illustrating exemplary functions of the input apparatus according to the first embodiment of the present invention.

FIG. 3 is a block diagram schematically illustrating an example of the electrical configuration of the electronic device 1 provided with an input apparatus 3 illustrated in FIG. 4.

Referring to FIG. 3, the electronic device 1 includes hardware components including a central processing unit (CPU) 10, a read only memory (ROM) 11, a random access memory (RAM) 12, an input unit 13, the LCD 21, the LCD 22, the touch panel 23, and the touch panel 24. These hardware components are electrically connected to each other via a bus 14. The input unit 13 is input unit different from the touch panels 23 and 24 and is, for example, a physical switch used for turning on and off the electronic device 1.

The CPU 10 appropriately reads out a control program stored in the ROM 11, etc. in advance into the RAM 12 to execute the readout control program. In addition, the CPU 10 controls the operation of each of the above hardware components. The ROM 11 stores the input program disclosed in the present invention and various control programs necessary to operate the electronic device 1 in advance. The input program is stored in the ROM 11 by reading out the storage medium including the input program. The electronic device 1 performs each operation in the input determining method disclosed in the present invention by executing the input program stored in the ROM 11 with the CPU 10. The RAM 12 is, for example, a static RAM (SRAM), a dynamic RAM (DRAM), or a flash memory. The RAM 12 temporarily stores a variety of data occurring in the execution of the control programs by the CPU 10.

Each of the touch panels 23 and 24 provided on the display screens 21a and 22a of the LCDs 21 and 22, respectively, supplies a signal corresponding to the pressed position to the CPU 10. The CPU 10 receives the signal from each of the touch panels 23 and 24 and virtually sets a coordinate plane on each of the touch panels 23 and 24. Then, the CPU 10 acquires the XY coordinate (hereinafter referred to as coordinate data) of the pressed position based on the coordinate plane. The CPU 10 stores the acquired coordinate data in a position storing unit 105 described below. Each of the touch panels 23 and 24 continues to supply a signal corresponding to the pressed position to the CPU 10 while the touch panels 23 and 24 are pressed. The CPU 10, which continuously receives the signals, acquires the coordinate data from the input signal every certain time and stores the acquired coordinate data in the position storing unit 105. As a result, in the slide operation, the coordinate data on the pressed positions varying in time series is stored in the position storing unit 105. Although the CPU 10 acquires the coordinate data, the touch panels 23 and 24 may acquire the coordinate data to supply the acquired coordinate data to the CPU 10.

Examples of the functions of the input apparatus 3, realized by the CPU 10 that executes the control programs, will now be described. The electronic device 1 includes the input apparatus 3, as described above. FIG. 4 is a block diagram illustrating exemplary functions of the input apparatus 3. The input apparatus 3 according to the first embodiment has the functions of, for example, a display unit 101, a input detecting unit 102, a screen determining unit 103, a position acquiring unit 104, the position storing unit 105, a timer unit 106, a start determining unit 107, an end determining unit 108, a vector calculating unit 109, a start-position estimating unit 110, a continuity determining unit 111, and a control unit 112.

The display unit 101 displays images on the display screen 21a of the LCD 21 and the display screen 22a of the LCD 22. The input detecting unit 102 detects a pressure on each of the touch panels 23 and 24. The screen determining unit 103 determines whether the pressure detected by the input detecting unit 102 is applied on the touch panel 23 or the touch panel 24.

If the input detecting unit 102 has detected a pressure, the position acquiring unit 104 acquires the coordinate data on the pressed position and stores the acquired coordinate data in the position storing unit 105. The position acquiring unit 104 continues to acquire the coordinate data on the pressed position every certain time until the input detecting unit 102 does not detect a pressure any more. The position acquiring unit 104 virtually sets the coordinate plane on each of the touch panels 23 and 24 and acquires coordinate data $(X(n), Y(n))$ on the pressed position based on the coordinate plane, where "n" denotes an integer value having an initial value of zero and is incremented by one each time the position acquiring unit 104 acquires the coordinate data. Accordingly, the coordinate data on the pressed position at start of a slide operation is equal to $(X(0), Y(0))$. The pressed position at start of an operation is hereinafter referred to as an input start position. The coordinate data on the pressed position at end of the slide operation is equal to $(X(n), Y(n))$. The pressed position at end of an operation is hereinafter referred to as an input end position.

In addition, the position acquiring unit 104 acquires the current time from the timer unit 106 measuring the time when the acquired coordinate data is stored. The position acquiring unit 104 stores the coordinate data in the position storing unit 105 along with a time t(n) that is acquired. The time t(n) is equal to t(0) at start of a slide operation and is equal to t(n) at end of the slide operation.

The start determining unit 107 determines that a touch operation is started on the basis of the detection of a pressure by the input detecting unit 102. The end determining unit 108 determines that the touch operation is terminated if the input detecting unit 102 detects no pressure.

The vector calculating unit 109 calculates an input vector if the end determining unit 108 determines that the touch operation is terminated. The input vector has a direction from the coordinate data (X(0), Y(0)) on the input start position of a slide operation to the coordinate data (X(n), Y(n)) on the input end position of the slide operation. In this case, the input vector is equal to (X(n)−X(0), Y(n)−Y(0)).

If the start determining unit 107 determines that one touch operation is started after the end determining unit 108 determines that another touch operation is terminated, the start-position estimating unit 110 determines whether the two touch operations are separately performed on the touch panels 23 and 24. A touch operation that is first performed is hereinafter referred to as a first operation and a touch operation that is performed after the first operation is terminated is hereinafter referred to as a second operation. If the first and second operations are separately performed on the touch panels 23 and 24, the start-position estimating unit 110 estimates a position that will be pressed at start of the second operation. The position that will be pressed at start of the second operation is hereinafter referred to as an estimated start position. If the estimated start position is pressed at start of the second operation, the continuity determining unit 111 determines that the first operation continues into the second operation.

Figure 5:
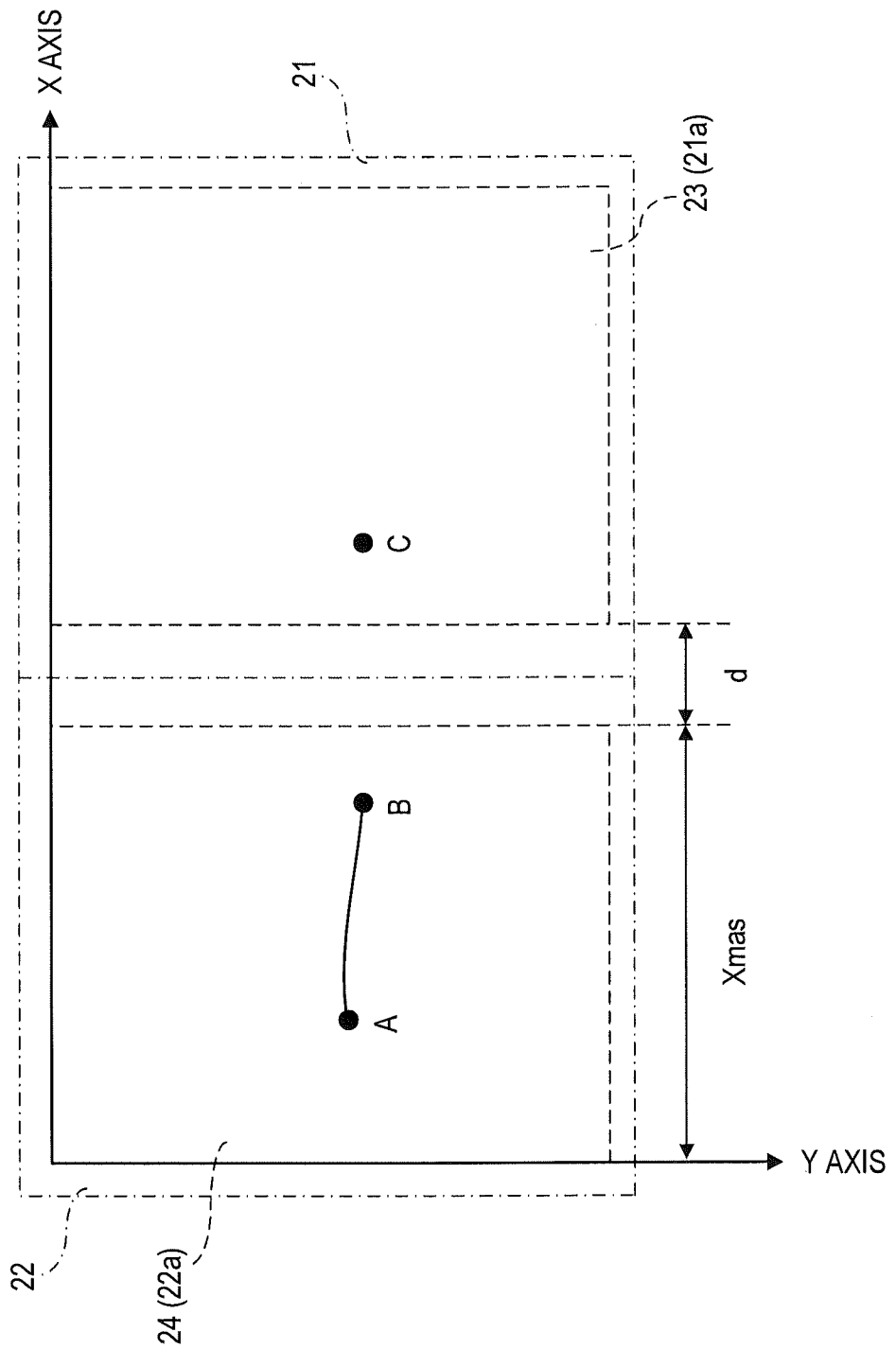
FIG. 5 is a schematic diagram illustrating an example of coordinate axes that are virtually set on the touch panels in estimation of an estimated start position according to the first embodiment of the present invention.

The start-position estimating unit 110 sets a coordinate plane common to the touch panels 23 and 24 in the estimation of the estimated start position. FIG. 5 is a schematic diagram illustrating an example of coordinate axes that are virtually set on the touch panels in the estimation of the estimated start position. The coordinate plane set on the touch panels uses the upper left corner of the left touch panel 24 as the origin. On the coordinate plane, the direction in which the touch panels 23 and 24 are arranged is set as the X axis and the direction of the shaft of the hinge mechanism 1*a* is set as the Y axis. As illustrated in FIG. 5, according to the first embodiment, the distance between the touch panel 23 and the touch panel 24, which are arranged in parallel, is denoted by "d". The width of the touch panel 24 in the X-axis direction is denoted by a distance "Xmax". In the example in FIG. 5, the first operation corresponds to a slide operation from a position A to a position B on the touch panel 24 and the second operation corresponds to an operation started from a position C on the touch panel 23. Accordingly, in this case, the estimated start position estimated by the start-position estimating unit 110 is positioned on the touch panel 23.

In the estimation of the estimated start position, the start-position estimating unit 110 acquires the time from the timer unit 106. Then, the start-position estimating unit 110 calculates a time period T between the time when the first operation is terminated to the time when the second operation is started. The start-position estimating unit 110 calculates coordinate data (Rx, Ry) by using the time period T and the input vector (X(n)−X(0), Y(n)−Y(0)) calculated by the vector calculating unit 109 according to Equations (1) and (2):

$$Rx = \left(1 + \alpha \frac{\text{Time period } T}{t(n) - t(0)}\right)(X(n) - X(0)) + X(0) \quad (1)$$

$$Ry = \left(1 + \alpha \frac{\text{Time period } T}{t(n) - t(0)}\right)(Y(n) - Y(0)) + Y(0) \quad (2)$$

In Equations (1) and (2), "α" denotes an empirical value or an experimental value in consideration of the distance d and "t(n)−t(0)" denotes the time period during which the first operation is performed. In other words, "t(n)−t(0)" denotes the time period during which the user continuously presses the touch panel 24 in the first operation. Accordingly, the estimated start position of the second operation is calculated from the operation speed of the first operation and the operation direction thereof.

The start-position estimating unit 110 sets the coordinate plane common to the touch panel 23 and the touch panel 24, as described above. Accordingly, the coordinate data (Rx, Ry) calculated according to Equations (1) and (2) is on the touch panel 23 but is coordinate data on the coordinate plane using the upper left corner of the touch panel 24 as the origin. The touch panel 23 is shifted from the touch panel 24 by an amount given by adding the distance d and the distance Xmax in the X-axis direction. Consequently, the start-position estimating unit 110 converts the coordinate data (Rx, Ry) calculated according to Equations (1) and (2) into coordinate data (Sx, Sy) on a coordinate plane using the upper left corner of the touch panel 23 as the origin according to Equations (3) and (4):

$$Sx = Rx - d - X\text{max} \quad (3)$$

$$Sy = Ry \quad (4)$$

The continuity determining unit 111 acquires the coordinate data on the start position of the second operation, pressed by the user, from the position acquiring unit 104. The continuity determining unit 111 compares the acquired coordinate data with the coordinate data (Sx, Sy) on the estimated start position calculated by the start-position estimating unit 110. The start position of the second operation is at the position C in the example in FIG. 5. The continuity determining unit 111 determines whether the continuity exists between the first operation and the second operation from the result of the comparison. For example, if the coordinate data on the position C is within a certain area around the coordinate data (Sx, Sy), the continuity determining unit 111 determines that the two pieces of the coordinate data is substantially matched with each other. The continuity determining unit 111 may determine that the two pieces of the coordinate data is substantially matched with each other if the distance between the coordinate data (Sx, Sy) and the coordinate data on the position C is within a certain value. If the continuity determining unit 111 determines that the two pieces of the coordinate data is substantially matched with each other, the continuity determining unit 111 determines that the first operation and the second operation compose a series of operations in which the second operation is continued from the first operation. The control unit 112 performs each process in accordance with the result of the determination by the continuity determining unit 111.

Figure 6B:
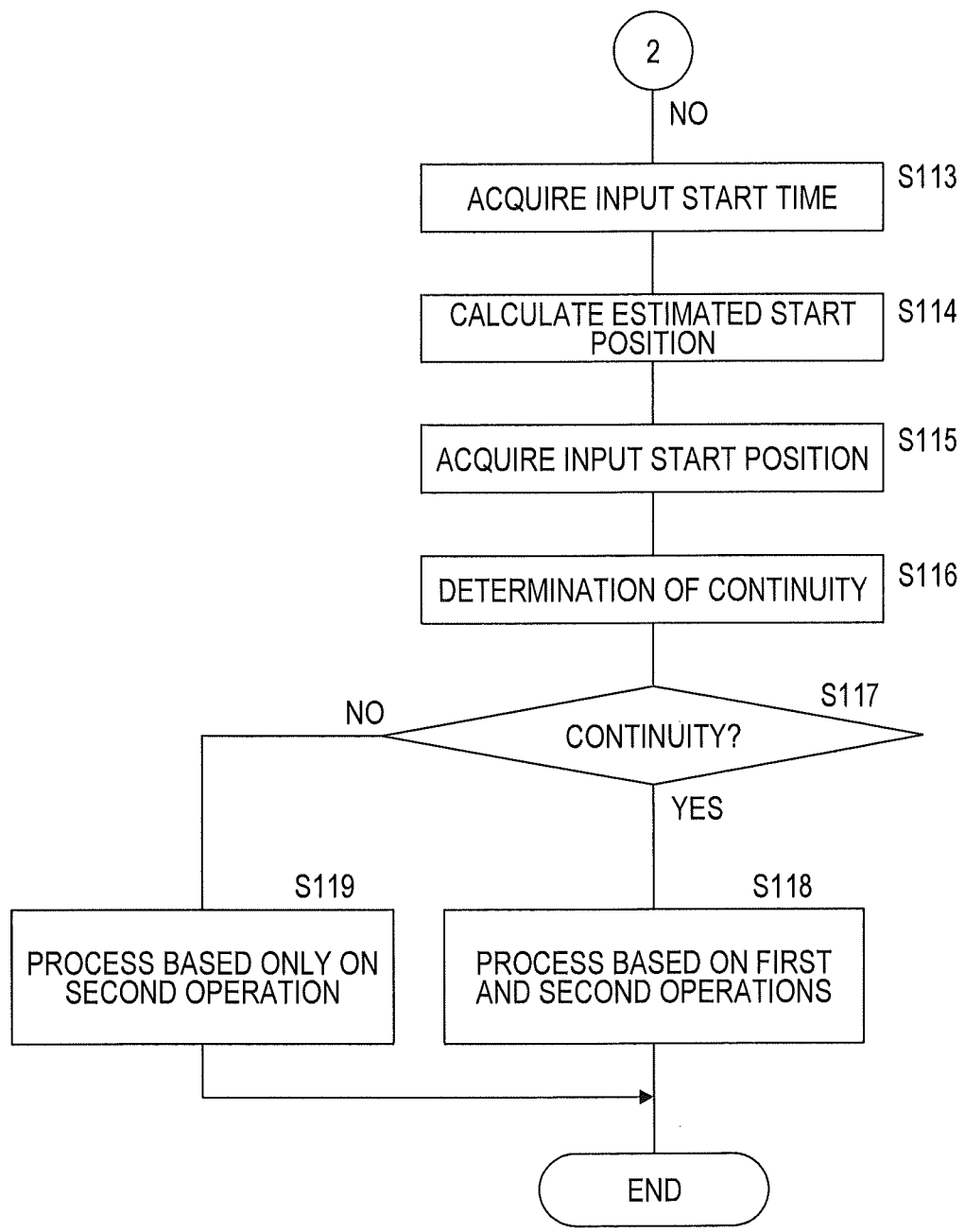

An example of the operation of the input apparatus 3 having the hardware components and the functions described above will now be described. FIGS. 6A and 6B are flowcharts illustrating an example of a process performed by the input apparatus 3. The process illustrated in FIGS. 6A and 6B are performed by the CPU 10 that functions as each processing unit in accordance with the control programs stored in the ROM 11 in the input apparatus 3.

Referring to FIG. 6A, in S101, the input apparatus 3 initializes the content stored in the position storing unit 105 or the like. For example, the input apparatus 3 sets the value of n described above to an initial value of zero. In S102, the input detecting unit 102 determines whether a pressure on the touch panel 23 or 24 is detected. If the input detecting unit 102 determines that no pressures is detected (NO in S102), the input detecting unit 102 repeats S102 until a pressure is detected. If the input detecting unit 102 determines that a pressure on the touch panel 23 or 24 is detected (YES in S102), the start determining unit 107 determines that a touch operation is started. In S103, the start determining unit 107 determines whether the detected touch operation is the first touch operation. The first touch operation means, for example, the first touch operation after the input apparatus 3 is turned on. When the content of the operation is reset when a certain time (for example, one minute) elapsed since the touch operation is terminated, the first touch operation may be a touch operation when the certain time elapsed since the previous touch operation is terminated.

If the start determining unit 107 determines that the detected touch operation is the first touch operation (YES in S103), the start determining unit 107 determines that the first operation is started. Then, the process goes to S106. If the start determining unit 107 determines that the touch operation is not the first touch operation (NO in S103), the start determining unit 107 determines that the second operation is started. In S104, the screen determining unit 103 determines which operation screen (specifically, which touch panel) the second operation is performed on. In S105, the screen determining unit 103 determines whether the operation screen on which the second operation is performed coincides with the operation screen on which the first operation is performed. For example, the screen determining unit 103 acquires an identification (ID), etc. of the touch panel 23 or 24 on which the first operation is performed and stores the acquired ID in the RAM 12 or the like. When the second operation is started, the screen determining unit 103 acquires the ID of the touch panel 23 or 24 on which the second operation is started. The screen determining unit 103 compares the acquired ID with the stored ID and, if the acquired ID coincides with the stored ID, determines that the operation screen of the first operation coincides with that of the second operation.

If the screen determining unit 103 determines that the operation screen on which the second operation is performed coincides with the operation screen on which the first operation is performed (YES in S105), the screen determining unit 103 determines that the second operation is not continued from the first operation and the process goes to S106. The case in which the operation screen on which the second operation is performed coincides with the operation screen on which the first operation is performed corresponds to a case in which the touch operations are continuously performed on the same touch panel. In S106, the position acquiring unit 104 acquires the coordinate data (X(n), Y(n)) on the pressed position and stores the acquired coordinate data in the position storing unit 105. In S107, the position acquiring unit 104 acquires the current time t(n) and stores the acquired current time t(n) in the position storing unit 105. The initial value of "n" is equal to zero. When S106 and S107 are first performed, the coordinate data and the current time acquired by the position acquiring unit 104 are (X(0), Y(0)) and t(0), respectively. In S108, the end determining unit 108 determines whether the touch operation is terminated on the basis of the detection of a pressure on the touch panel 23 or 24 by the input detecting unit 102.

If the end determining unit 108 determines that the touch operation is not terminated (NO in S108), then in S109, the position acquiring unit 104 determines whether a certain time elapsed since the time t(n) acquired in S107. The case in which it is determined that the touch operation is not terminated corresponds to a case in which the detection of a pressure is continued. The time t(n) acquired in S107 corresponds to the time when the coordinate data (X(n), Y(n)) on the pressed position is acquired in S106. In other words, the position acquiring unit 104 determines whether the certain time elapsed since the last pressed position is detected in S109. If the position acquiring unit 104 determines that the certain time did not elapse since the last pressed position is detected (NO in S109), the position acquiring unit 104 enters in a waiting state until the certain time elapsed. If the position acquiring unit 104 determines that the certain time elapsed since the last pressed position is detected (YES in S109), then in S110, the position acquiring unit 104 increments the value of n by one. Then, the process goes back to S106. The position acquiring unit 104 detects the pressed position every certain time while the touch operation is continued.

If the end determining unit 108 determines that the touch operation is terminated (YES in S108), then in S111, the position acquiring unit 104 acquires the time when the touch operation is terminated. The time when a touch operation is terminated is hereinafter referred to as an input end time. In S112, the vector calculating unit 109 calculates the input vector (X(n)−X(0), Y(n)−Y(0)). Then, the process goes back to S102.

If the screen determining unit 103 determines that the operation screen on which the second operation is performed does not coincide with the operation screen on which the first operation is performed (NO in S105), the input apparatus 3 starts a process of determining the continuity between the first operation and the second operation illustrated in FIG. 6B. Referring to FIG. 6B, in S113, the start-position estimating unit 110 acquires the time when the second operation is started. The time when the second operation is started is hereinafter referred to as an input start time. In S114, the start-position estimating unit 110 calculates the coordinate data (Sx, Sy) on the estimated start position. Specifically, as described above, the start-position estimating unit 110 calculates the time period T between the time when the first operation is terminated to the time when the second operation is started from the input end time of the first operation and the input start time of the second operation that are acquired. The start-position estimating unit 110 calculates the time period t(n)−t(0) during which the first operation is performed. The start-position estimating unit 110 substitutes the time period T, the time period t(n)−t(0), and the input vector (X(n)−X(0), Y(n)−Y(0)) in Equations (1) and (2) to calculate the coordinate data (Rx, Ry) on the estimated start position. The start-position estimating unit 110 converts the coordinate data (Rx, Ry) into the coordinate data (Sx, Sy) according to Equations (3) and (4).

After the coordinate data (Sx, Sy) on the estimated start position is calculated, in S115, the continuity determining unit 111 acquires the coordinate data on the input start position of the second operation. In S116, the continuity determining unit 111 determines the continuity between the first operation and the second operation. For example, the continuity determining unit 111 determines whether the input start position of the second operation is within a certain area around the estimated coordinate data (Sx, Sy). In S117, the continuity determining unit 111 determines whether the continuity exists between the first operation and the second operation on the basis of the determination result of the continuity. The continuity determining unit 111 determines that the continuity exists between the first operation and the second operation, for example, if the input start position of the second operation is within the certain area.

If the continuity determining unit 111 determines that the first operation continues into the second operation (YES in S117), then in S118, the control unit 112 performs a process based on the first and second operations on the basis of the determination that the first operation continues into the second operation. For example, when the letters "CDEFG" are selected on the touch panel 24 and the letters "HIJKL" are selected on the touch panel 23, as described above with reference to FIG. 2, it is determined that the series of letters "CDEFGHIJKL" are selected. If the continuity determining unit 111 determines that the first operation does not continue into the second operation (NO in S117), then in S119, the control unit 112 performs a process based only on the second operation. For example, when the letters "CDEFG" are selected on the touch panel 24 and the letters "HIJKL" are selected on the touch panel 23 in the example in FIG. 2, it is determined that only the letters "HIJKL" are selected. Then, the process illustrated in FIGS. 6A and 6B is terminated.

As described above, since the input apparatus 3 according to the first embodiment estimates the start position of the second operation from the speed and direction of the first operation, it is possible to appropriately estimate the start position that is varied depending on the user. In addition, with the input apparatus 3 according to the first embodiment, even if the operation speed is varied depending on the user or if the user performs the operation in an unstable posture, it is possible to cause the second operation of the user to be processed in the manner intended by the user.

Second Embodiment

An input apparatus 3 according to a second embodiment of the present invention will now be described. The second embodiment differs from the first embodiment in a method of calculating an input vector. The difference from the first embodiment will be described here. Since the input apparatus 3 according to the second embodiment may be realized by a configuration similar to the one according to the first embodiment described above, the same reference numerals are used in the second embodiment to identify the same components in the first embodiment and a description of such components is omitted herein.

The vector calculating unit 109 calculates an input vector concerning the first operation after the first operation is terminated. Specifically, the vector calculating unit 109 calculates the input vector on the basis of the input end position of the first operation and a position close to the input end position. The position close to the input end position is, for example, a position within a certain distance from the input end position. Alternatively, the position close to the input end position may be, for example, a pressed position detected a certain time before the input end time. Since the vector calculating unit 109 calculates the input vector by using the position close to the input end position, the vector calculating unit 109 may calculate the input vector that is varied depending on the trajectory of the first operation.

Figure 7:
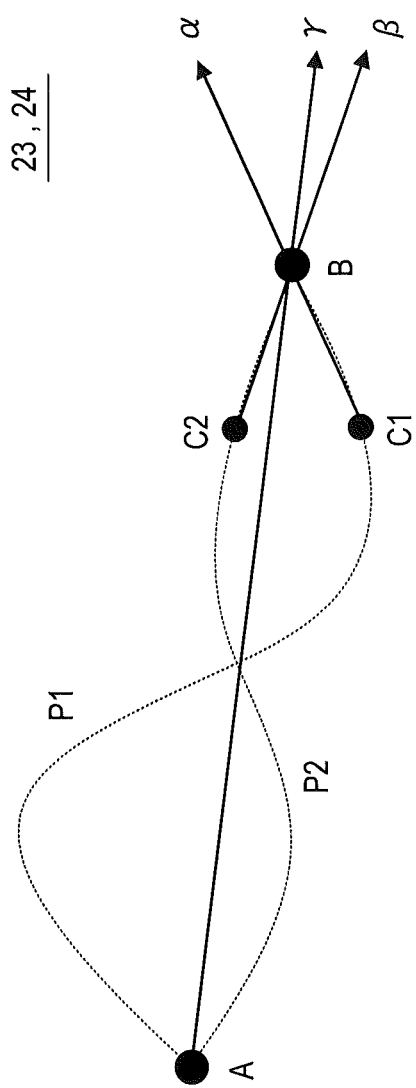
FIG. 7 illustrates examples of input vectors according to a second embodiment of the present invention.

FIG. 7 illustrates examples of input vectors according to the second embodiment. A case is illustrated in FIG. 7 in which the user performs slide operations P1 and P2 from an input start position A to an input end position B. Dotted lines in FIG. 7 denote the trajectories of the slide operations P1 and P2. An input vector γ according to the first embodiment is also illustrated in FIG. 7 for comparison.

The position acquiring unit 104 acquires the coordinate data on the pressed position every certain time and stores the acquired coordinate data in the position storing unit 105, as in the first embodiment. The vector calculating unit 109 acquires the coordinate data on the input end position B and the coordinate data on a position close to the input end position B from the stored coordinate data. Then, the vector calculating unit 109 calculates the input vector on the basis of the two pieces of the coordinate data. In the example in FIG. 7, a position close to the input end position B in the slide operation P1 is denoted by "C1" and a position close to the input end position B in the slide operation P2 is denoted by "C2". The positions C1 and C2 are positions under the similar condition. The positions under the similar condition means, for example, positions a certain time before the input end time. Since the position C1 differs from the position C2 in the coordinate data because the slide operation P1 has a trajectory different from that of the slide operation P2. Accordingly, an input vector α calculated on the basis of the position B and the position C1 differs from an input vector β calculated on the basis of the position B and the position C2. In other words, the input vectors reflecting the operation speed or direction immediately before the first operation is terminated are calculated in the second embodiment while the same input vector γ is calculated regardless of the trajectories of the slide operations in the first embodiment.

After the vector calculating unit 109 calculates the input vector, the start-position estimating unit 110 measures the operation time during which the first operation is performed to calculate the coordinate data on the estimated start position. Since the input vector to be calculated is varied depending on the slide operation, as described above, the start-position estimating unit 110 may calculate the estimated start position that is varied depending on the slide operation. The start-position estimating unit 110 may estimate the estimated start position reflecting the direction or speed of the slide operation, which is varied depending on the user, in the above manner. After the estimated start position is estimated, the continuity determining unit 111 acquires the start position of the second operation to determine whether the continuity exists between the first operation and the second operation on the basis of the start position of the second operation and the coordinate data on the calculated estimated start position, as in the first embodiment.

As described above, according to the second embodiment, it is possible to more accurately calculate the estimated start position according to the trajectories of the operations, compared with the first embodiment in which the same input vector γ is calculated regardless of the trajectories of the slide operations.

Third Embodiment

An input apparatus 3 according to a third embodiment of the present invention will now be described. In the third embodiment, the start position of the second operation is estimated before the second operation is started and the estimated position is displayed to indicate the estimated position to the user. The difference from the first and second embodiments will be described here. Since the input apparatus 3 according to the third embodiment may be realized by a configuration similar to the ones according to the first and second embodiment described above, the same reference numerals are used in the third embodiment to identify the same components in the first and second embodiments and a description of such components is omitted herein.

Figure 8:
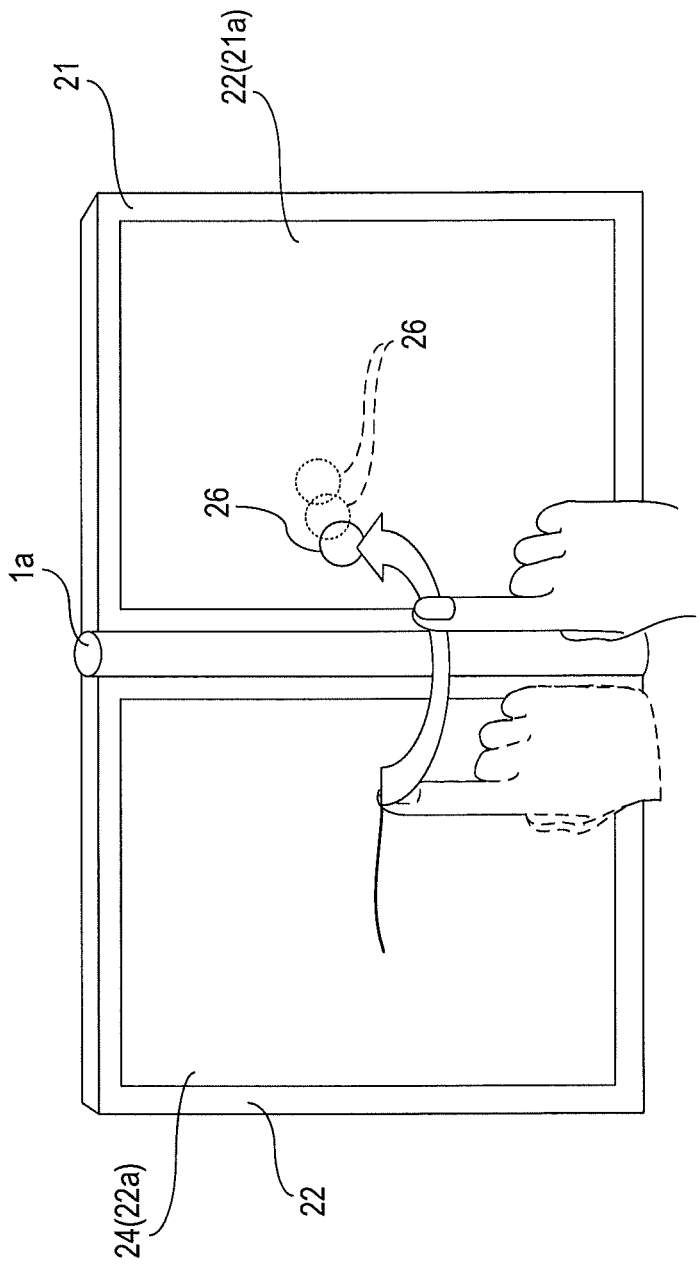
FIG. 8 is a schematic diagram illustrating an exemplary situation in which an electronic device provided with an input apparatus according to a third embodiment of the present invention is operated.

FIG. 8 is a schematic diagram illustrating an exemplary situation in which the user operates the input apparatus 3 according to the third embodiment. A state immediately before the second operation is started on the touch panel 23 after the first operation is performed on the touch panel 24 is illustrated in FIG. 8. The estimated start position is calculated when the second operation is started after the first operation is terminated in the first embodiment. In contrast, the estimated start position is calculated before the second operation is started after the first operation is terminated in the third embodiment. As shown in FIG. 8, a circular guide area 26 is displayed on the basis of the calculated estimated start position. The input apparatus 3 determines that the first operation continues into the second operation on the basis of a pressure on the displayed guide area 26. Accordingly, the user may determine where the second operation is to be started when the user wants to continuously perform the first operation and the second operation. The guide area 26 may have a rectangular shape or another shape.

The estimated start position is varied depending on the time period between the time when the first operation is terminated and the time when the second operation is started. The time period between the time when the first operation is terminated and the time when the second operation is started is hereinafter referred to as a discontinuation time. For example, the discontinuation time will be prolonged with the increasing distance between the input end position of the first operation and the input start position of the second operation. Accordingly, the input apparatus 3 according to the third embodiment calculates the estimated start position every certain time before the second operation is started. The guide area 26 corresponding to the estimated start position is moved with time, as illustrated by dotted lines in FIG. 8. Accordingly, the movement of the guide area 26 with time allows even the user who performs the operation at a lower speed or even the user who is unfamiliar with the operation to more accurately determine where the touch operation is to be started for the determination of the existence of the continuity.

Figure 9:
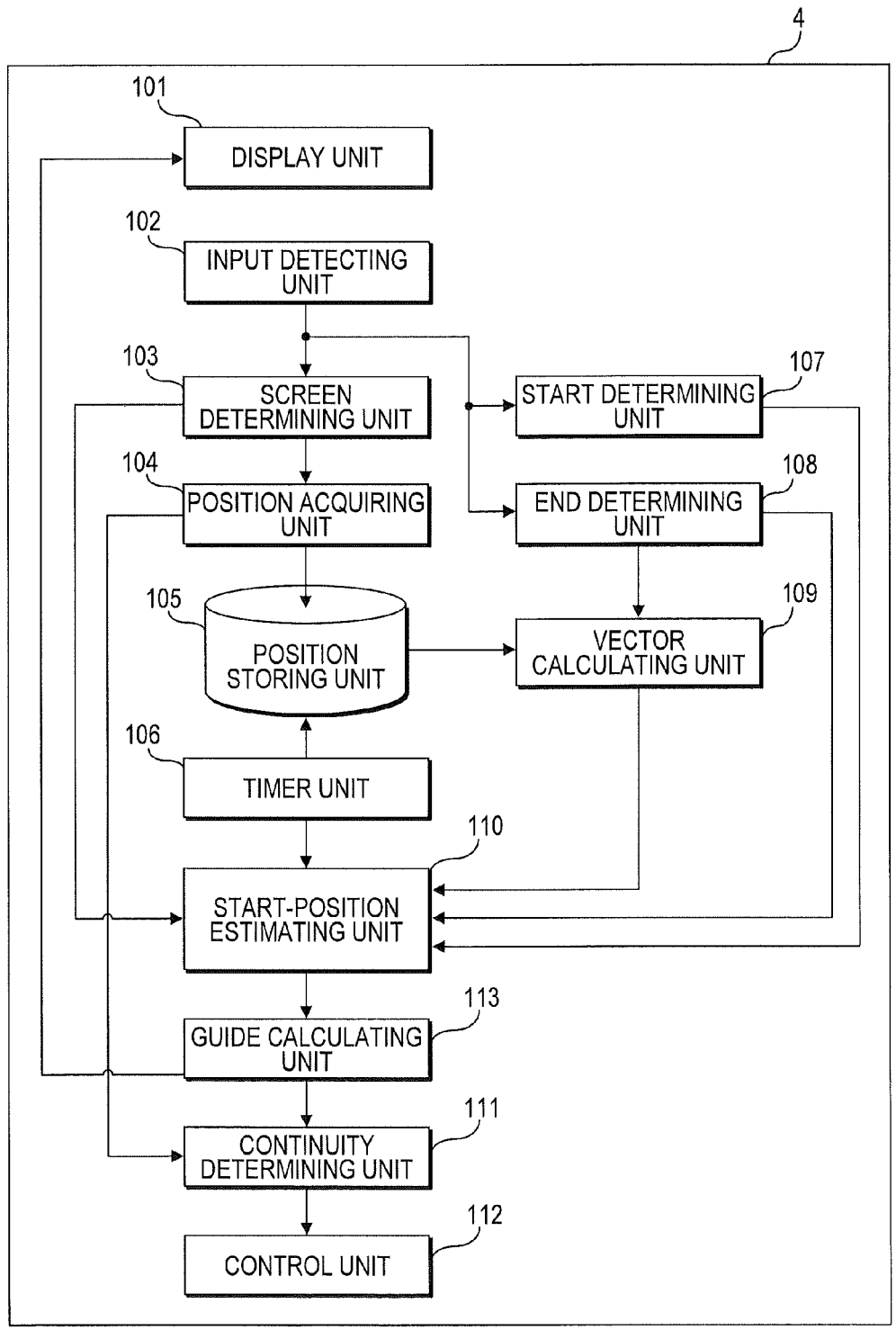
FIG. 9 is a block diagram illustrating exemplary functions of the input apparatus according to the third embodiment of the present invention.

FIG. 9 is a block diagram illustrating exemplary functions of an input apparatus 4 according to the third embodiment.

The input apparatus 4 according to the third embodiment further has the function of, for example, a guide calculating unit 113, in addition to the functions described above in the first embodiment. The start-position estimating unit 110 acquires a time from the timer unit 106 after the vector calculating unit 109 calculates the input vector. The start-position estimating unit 110 measures an elapsed time since the first operation is terminated. The start-position estimating unit 110 calculates the coordinate data (Sx, Sy) on the estimated start position every certain time before the start determining unit 107 determines that the second operation is started. The coordinate data (Sx, Sy) is calculated in the same manner as in the first and second embodiments. The guide calculating unit 113 calculates the guide area around the estimated start position calculated by the start-position estimating unit 110. The display unit 101 displays the guide area calculated by the guide calculating unit 113 on the display screen 21a or 22a where the second operation will possibly be performed.

Figure 10A:
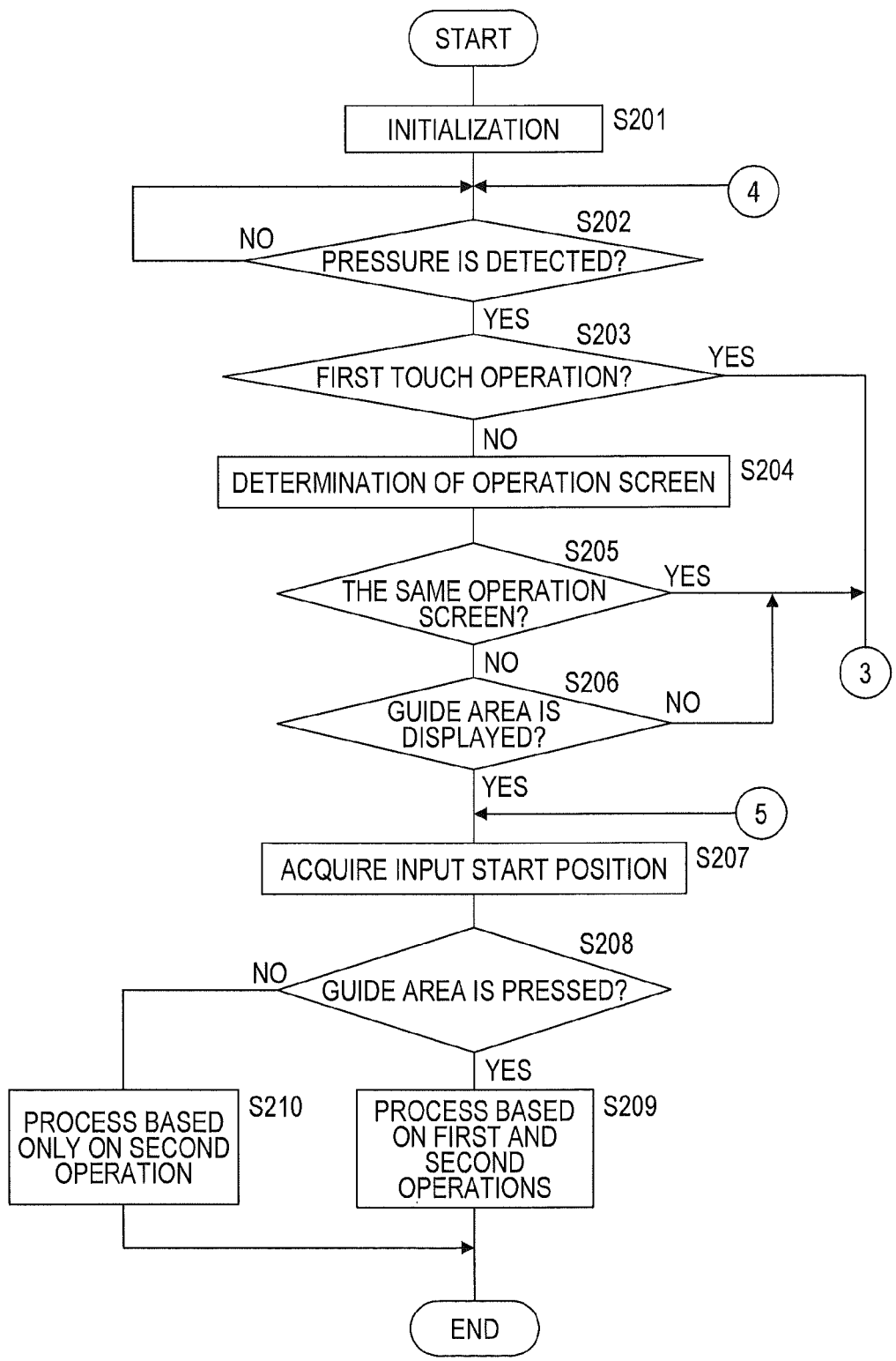

An example of the operation of the input apparatus 4 according to the third embodiment will now be described. FIGS. 10A and 10B are flowcharts illustrating an example of a process performed by the input apparatus 4. The process illustrated in FIGS. 10A and 10B are performed by the CPU 10 that functions as each processing unit in accordance with the control programs stored in the ROM 11 in the input apparatus 4.

Referring to FIG. 10A, in S201, the input apparatus 4 initializes the content stored in the position storing unit 105. In S202, the input detecting unit 102 determines whether a pressure on the touch panel 23 or 24 is detected. If the input detecting unit 102 determines that no pressures is detected (NO in S202), the input detecting unit 102 repeats S202 until a pressure is detected. If the input detecting unit 102 determines that a pressure on the touch panel 23 or 24 is detected (YES in S202), the start determining unit 107 determines that a touch operation is started. In S203, the start determining unit 107 determines whether the detected touch operation is the first touch operation.

If the start determining unit 107 determines that the detected touch operation is the first touch operation (YES in S203), the start determining unit 107 determines that the first operation is started. Then, the process goes to S211 in FIG. 10B. If the start determining unit 107 determines that the detected touch operation is not the first touch operation (NO in S203), the start determining unit 107 determines that the second operation is started. In S204, the screen determining unit 103 determines which operation screen the second operation is performed on. In S205, the screen determining unit 103 determines whether the operation screen on which the second operation is performed coincides with the operation screen on which the first operation is performed. If the screen determining unit 103 determines that the operation screen on which the second operation is performed coincides with the operation screen on which the first operation is performed (YES in S205), the screen determining unit 103 determines that the second operation is not continued from the first operation and the process goes to S211 in FIG. 10B.

If the screen determining unit 103 determines that the operation screen on which the second operation is performed does not coincide with the operation screen on which the first operation is performed (NO in S205), the CPU 10 determines that the second operation is possibly continued from the first operation. In S206, the CPU 10 determines whether the guide area 26 is displayed on the display screen 21a or 22a. For example, when the first operation is performed on the left touch panel 24, the guide area 26 is displayed on the right display screen 21a. If the CPU 10 determines that the guide area 26 is not displayed (NO in S206), the CPU 10 determines that the second operation is not continued from the first operation and the process goes to S211 in FIG. 10B.

Referring to FIG. 10B, in S211, the position acquiring unit 104 acquires the coordinate data (X(n), Y(n)) on the pressed position and stores the acquired coordinate data in the position storing unit 105. In S212, the position acquiring unit 104 acquires the current time t(n) and stores the acquired current time t(n) in the position storing unit 105. In S213, the end determining unit 108 determines whether the touch operation is terminated on the basis of the detection of a pressure on the touch panel 23 or 24 by the input detecting unit 102. If the end determining unit 108 determines that the touch operation is not terminated (NO in S213), then in S214, the position acquiring unit 104 determines whether a certain time elapsed since the time t(n) acquired in S212. If the position acquiring unit 104 determines that the certain time did not elapse since the time t(n) acquired in S212 (NO in S214), the position acquiring unit 104 enters in a waiting state until the certain time elapsed. If the position acquiring unit 104 determines that the certain time elapsed since the time t(n) acquired in S212 (YES in S214), then in S215, the position acquiring unit 104 increments the value of n by one. Then, the process goes back to S211. The position acquiring unit 104 detects the pressed position every certain time while the touch operation is continued.

If the end determining unit 108 determines that the touch operation is terminated (YES in S213), then in S216, the position acquiring unit 104 acquires the input end time. In S217, the vector calculating unit 109 calculates the input vector (X(n)−X(0), Y(n)−Y(0)). The input vector may be calculated from a position close to the input end position described above in the second embodiment. In S218, the start-position estimating unit 110 acquires the current time to calculate the elapsed time since the input end time. In S219, the start-position estimating unit 110 calculates the coordinate data (Sx, Sy) on the estimated start position according to Equations (1) and (2). The time period T in Equations (1) and (2) corresponds to the elapsed time calculated in S218.

In S220, the guide calculating unit 113 displays the guide area based on the calculated estimated start position in the display screen 21a or 22a. For example, when the first operation is performed on the left touch panel 24, the display unit 101 displays the guide area 26 on the right display screen 21a.

In S221, the input detecting unit 102 determines whether a pressure is detected. If the input detecting unit 102 determines that no pressure is detected (NO in S221), the start determining unit 107 determines that the touch operation is not started. In S222, the continuity determining unit 111 determines whether a certain time elapsed since the estimated start position is calculated in S219. If the continuity determining unit 111 determines that the certain time did not elapse since the estimated start position is calculated in S219 (NO in S222), the process goes back to S221. If the continuity determining unit 111 determines that the certain time elapsed since the estimated start position is calculated in S219 (YES in S222), the process goes back to S219. Then, the start-position estimating unit 110 calculates the estimated start position again. The time period T in Equations (1) and (2) at this time corresponds to the elapsed time since the input end time acquired in S216. In the above manner, the input apparatus 4 calculates the estimated start position every certain time and displays the guide area 26 based on the calculated estimated start position in the display screen 21a or 22a.

If the input detecting unit 102 determines that a pressure is detected (YES in S221), then in S223, the screen determining unit 103 determines which operation screen the touch operation is started on. The case in which a pressure is detected corresponds to the case in which the touch operation is started. In S224, the input apparatus 4 determines whether the guide area 26 is displayed on the display screen 21a or 22a corresponding to the operation screen. For example, when the touch operation is started on the touch panel 23, the input apparatus 4 determines whether the guide area 26 is displayed on the display screen 21a covered with the touch panel 23.

If the input apparatus 4 determines that the guide area 26 is not displayed (NO in S224), the continuity determining unit 111 determines that the touch operation started in S221 is not continued from the touch operation terminated in S213. In S225, the display unit 101 does not display the guide area 26 displayed in S220. Then, the process goes back to S202. If the input apparatus 4 determines that the guide area 26 is displayed (YES in S224), the process goes back to S207 in FIG. 10A. Also if the CPU 10 determines in S206 that the guide area 26 is displayed (YES in S206), the process goes to S207 in FIG. 10A.

Referring back to FIG. 10A, in S207, the continuity determining unit 111 acquires the coordinate data on the input start position of the second operation. In S208, the continuity determining unit 111 determines whether the guide area 26 displayed on the display screen 21a or 22a is pressed on the basis of the coordinate data on the input start position of the second operation detected by the position acquiring unit 104. If the continuity determining unit 111 determines that the guide area 26 is pressed (YES in S208), the continuity determining unit 111 determines that the first operation continues into the second operation. In S209, the control unit 112 performs a process based on the first and second operations. Then, the process illustrated in FIGS. 10A and 10B is terminated. If the continuity determining unit 111 determines that the guide area 26 is not pressed (NO in S208), the continuity determining unit 111 determines that the first operation does not continue into the second operation. In S210, the control unit 112 performs a process based only on the second operation. Then, the process illustrated in FIGS. 10A and 10B is terminated.

As described above, the input apparatus 4 according to the third embodiment displays the guide area 26 where the second operation is started. Accordingly, the user may determine where the touch operation is to be started. As a result, the user may perform the touch operation in the manner intended by the user even if the user is unfamiliar with the operation.

Although the embodiments of the present invention are specifically described above, the configurations and the operations may be appropriately changed. Accordingly, the embodiments of the present invention are not limited to the ones described above. For example, the input apparatus disclosed in the present invention determines the continuity of touch operations performed when a series of letters is selected from a sentence displayed across the two display screens 21a and 22a in the above embodiments. However, the input apparatus may determine the continuity of other operations. For example, the input apparatus disclosed in the present invention may determine the continuity of touch operations performed when an object that is selected is moved across the two display screens 21a and 22a.

In addition, the input apparatus disclosed in the present invention may be provided with two or more display screens and touch panels. The methods of estimating, for example, the equations used in the estimation of the estimated start position are not limited to the ones described in the above embodiments and may be appropriately changed. The touch operation may be by a stylus pen.

Therefore, according to an aspect of the embodiments of the invention, any combinations of one or more of the described features, functions, operations, and/or benefits can be provided. A combination can be one or a plurality. The embodiments can be implemented as an apparatus (a machine) that includes computing hardware (i.e., computing apparatus), such as (in a non-limiting example) any computer that can store, retrieve, process and/or output data and/or communicate (network) with other computers. According to an aspect of an embodiment, the described features, functions, operations, and/or benefits can be implemented by and/or use computing hardware and/or software. The apparatus (e.g., the electronic device in FIG. 3, the described input apparatus of the electronic device, . . . etc.) comprises a controller (CPU) (e.g., a hardware logic circuitry based computer processor that processes or executes instructions, namely software/program), computer readable recording media, and/or transmission communication media interface (network interface), and one or more display devices with a plurality of display screens, all in communication through a data communication bus. In addition, an apparatus can include one or more apparatuses in computer network communication with each other or other apparatuses. In addition, a computer processor can include one or more computer processors in one or more apparatuses or any combinations of one or more computer processors and/or apparatuses. An aspect of an embodiment relates to causing one or more apparatuses and/or computer processors to execute the described operations. The results produced can be displayed on one or more displays.

A program/software implementing the embodiments may be recorded on computer-readable recording media. Examples of the computer-readable recording media include a magnetic recording apparatus, an optical disk, a magneto-optical disk, and/or volatile and/or non-volatile semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), DVD-ROM, DVD-RAM (DVD-Random Access Memory), BD (Blue-ray Disk), a CD-ROM (Compact Disc-Read Only Memory), and a CD-R (Recordable)/RW.

The program/software implementing the embodiments may also be included/encoded as a data signal and transmitted over transmission communication media. A data signal moves on transmission communication media, such as wired network or wireless network, for example, by being incorporated in a carrier wave. The data signal may also be transferred by a so-called baseband signal. A carrier wave can be transmitted in an electrical, magnetic or electromagnetic form, or an optical, acoustic or any other form.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

The invention claimed is:

1. An input apparatus comprising:
    a display capable of displaying images on a plurality of display screens; and
    a processor coupled to the display and configured to:
        detect a first input by a user on a first display screen, a second input by the user on the first display screen, and a third input by the user on a second display screen;
        acquire a first position on the first display screen where the first input is detected, a second position on the first display screen where the second input is detected, and a third position on the second display screen where the third input is detected,
        estimate a start position of a second operation on the second display screen, the second operation associated with a first operation including the first input and the second input on the first display screen, based upon an input vector calculated on basis of the acquired first position and a position close to the second position on the first display screen for varying the input vector depending on a trajectory of the first operation including the first input and the second input, the position close to the second position on the first display screen detected according to a certain time before the second input when the first operation is terminated and/or within a certain distance from the second position when determined that the first operation is terminated, and on basis of a first elapsed time from the first input to the second input on the first display screen, and
        determine whether the third input is associated with the first operation based upon the estimated start position of the second operation on the second display screen.

2. The input apparatus according to claim 1,
    wherein the processor is further configured to determine that the third input is associated with the first operation when the acquired third position is within a certain range from the estimated start position on the second display screen.

3. The input apparatus according to claim 1, wherein the processor is further configured to:
    measure a second elapsed time since a determination that the first operation on the first display screen is terminated,
    wherein the start position of the second operation is further estimated based upon the measured second elapsed time, and
    wherein a certain image is displayed on the second display screen based upon the start position.

4. The input apparatus according to claim 1,
    wherein a certain image indicating a certain area around the start position is displayed.

5. The input apparatus according to claim 3,
    wherein the processor is configured to determine that the third input is associated with the first operation when the acquired third position is within a certain range from the estimated start position on the second display screen.

6. The input apparatus according to claim 2, wherein the processor is further configured to:
    measure second elapsed time since a determination that the first operation on the first display screen is terminated,
    wherein the start position of the second operation is further estimated on basis of the measured second elapsed time measured, and
    wherein a certain image is displayed on the second display screen on the basis of the start position.

7. A non-transitory storage medium storing an input program that causes a computer to execute:
    causing a plurality of display screens on which images are to be displayed to display the images;
    detecting a first input by a user on a first display screen;
    detecting a second input by the user on the first display screen;
    acquiring a first position on the first display screen where the first input is detected;
    acquiring a second position on the first display screen where the second input is detected;
    estimating a start position of a second operation on athe second display screen, the second operation associated with a first operation including the first input and the second input on the first display screen, based upon an input vector calculated on basis of the acquired first position and a position close to the second position on the first display screen for varying the input vector depending on a trajectory of the first operation including the first input and the second input, the position close to the second position on the first display screen detected according to a certain time before the second input when the first operation is terminated and/or within a certain distance from the second position when determined that the first operation is terminated, and on basis of a first elapsed time from the first input to the second input on the first display screen;

detecting a third input by the user on the second display screen;

acquiring a third position on the second display screen where the third input is detected; and determining whether the third input is associated with the first operation based upon the estimated start position of the second operation on the second display screen.

8. An input determining method executed by a computer, the method comprising:

causing a plurality of display screens on which images are to be displayed to display the images;

detecting a first input by a user on a first display screen;

detecting a second input by the user on the first display screen;

acquiring a first position on the first display screen where the first input is detected;

acquiring a second position on the first display screen where the second input is detected;

estimating a start position of a second operation on athe second display screen, the second operation associated with a first operation including the first input and the second input on first display screen, based upon an input vector calculated on basis of the acquired first position and a position close to the second position on the first display screen for varying the input vector depending on a trajectory of the first operation including the first input and the second input, the position close to the second position on the first display screen detected according to a certain time before the second input when the first operation is terminated and/or within a certain distance from the second position when determined that the first operation is terminated, and on basis of a first elapsed time from the first input to the second input on the first display screen;

detecting a third input by the user on the second display screen;

acquiring a third position on the second display screen where the third input is detected; and determining whether the third input is associated with the first operation based upon the estimated start position of the second operation on the second display screen.

9. The input determining method according to claim 8, further comprising:

determining that the third input is associated with the first operation when the acquired third position is within a certain range from the estimated start position on the second display screen.

10. The input determining method according to claim 8, further comprising:

measuring a second elapsed time since a determination that the first operation on the first display screen is terminated;

further estimating the start position of the second operation based upon the measured second elapsed time; and displaying a certain image on the second display screen based upon the start position.

11. The input determining method according to claim 8, further comprising displaying a certain image indicating a certain area around the start position.

12. The input determining method according to claim 10, further comprising:

determining that the third input is associated with the first operation when the acquired third position is within a certain range from the estimated start position on the second display screen.

13. The input determining method according to claim 9, further comprising:

measuring a second elapsed time since a determination that the first operation on the first display screen is terminated;

further estimating the start position of the second operation on basis of the measured second elapsed time measured; and displaying a certain image on the second display screen on the basis of the start position.

* * * * *

UNITED STATES PATENT AND TRADEMARK OFFICE
CERTIFICATE OF CORRECTION

PATENT NO. : 8,803,818 B2  
APPLICATION NO. : 12/793921  
DATED : August 12, 2014  
INVENTOR(S) : Naomi Iwayama et al.

Page 1 of 1

It is certified that error appears in the above-identified patent and that said Letters Patent is hereby corrected as shown below:

In the Claims

Column 18, Line 52, In Claim 7, delete "athe" and insert -- the --, therefor.

Column 19, Line 19, In Claim 8, delete "athe" and insert -- the --, therefor.

Signed and Sealed this  
Twenty-third Day of December, 2014

Michelle K. Lee  
*Deputy Director of the United States Patent and Trademark Office*